No. 756,389. PATENTED APR. 5, 1904.
J. W. MONTGOMERY.
WIRE STRETCHER.
APPLICATION FILED JUNE 10, 1903.
NO MODEL.

Witnesses
Inventor
J. W. Montgomery
By
Chandler & Chandler
Attorneys

No. 756,389. Patented April 5, 1904.

UNITED STATES PATENT OFFICE.

JOHN W. MONTGOMERY, OF NIMROD, TEXAS.

WIRE-STRETCHER.

SPECIFICATION forming part of Letters Patent No. 756,389, dated April 5, 1904.

Application filed June 10, 1903. Serial No. 160,813. (No model.)

*To all whom it may concern:*

Be it known that I, JOHN W. MONTGOMERY, a citizen of the United States, residing at Nimrod, in the county of Eastland, State of Texas, have invented certain new and useful Improvements in Wire-Stretchers; and I do hereby declare the following to be a full, clear, and exact description of the invention, such as will enable others skilled in the art to which it apper10 tains to make and use the same.

This invention relates to wire-stretchers; and it has for its object to provide a stretcher which will be formed of a single bar of metal at a minimum cost and which will have one of its wire-holding members so formed that it may be used also in pulling staples.

A further object of the invention is to provide a stretcher having a cutting-blade conveniently arranged, so that after the stretch20 ing operation and after the wire has been firmly stapled to the end post it may be cut off, the cutting-blade being also useful for cutting wire at other times.

Figure 1:
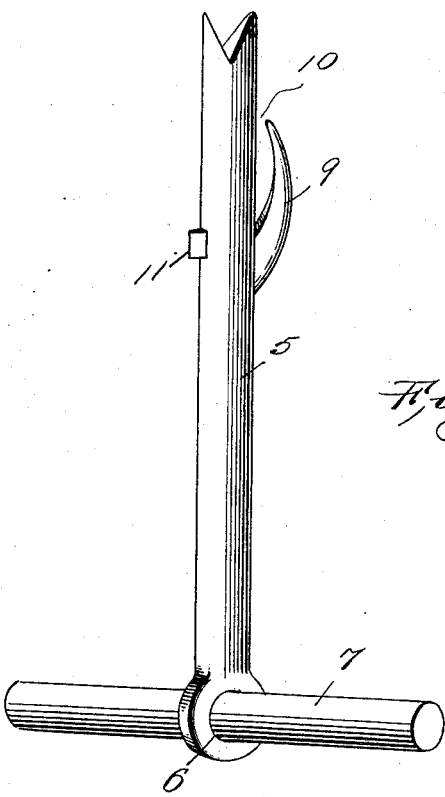
Figure 2:
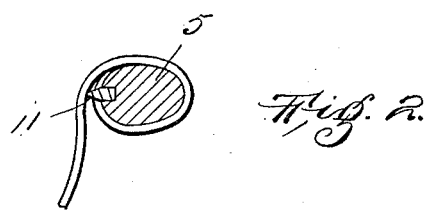

In the drawings forming a portion of this specification, and in which like numerals of reference indicate similar parts in both views, Figure 1 is a perspective view of the wire-stretcher. Fig. 2 is a transverse section through the wire-stretcher at one side of the cutting-blade, the position of the wire during the cutting operation being illustrated.

Referring now to the drawings, the present wire-stretcher consists of a bar 5, which is preferably of metal, and at one end of which is a transverse perforation or eye 6, which is designed to receive a cross-bar 7, which forms a handle, which is grasped to rotate the bar 5 during the stretching operation. At the opposite end of the bar 5 from the eye 6 and spaced slightly rearwardly from the extremity thereof is formed a finger 9 of substantially arc shape. This finger from its base curves outwardly and away from the bar 5 and then inwardly, so that its extremity is separated from the face of the bar 5 by only a slight interspace 10 sufficient to receive a wire or a staple in its passage into the inclosure between the finger and the bar 5. The inner face of the finger—that is, the face adjacent to the bar 5—is thus concaved.

In the operation of stretching the wire the wire is engaged between the finger and the adjacent face of the bar and the bar is then rotated so that the wire is wound over the finger and the bar in the manner illustrated in Fig. 2 of the drawings, this operation being continued until the wire is placed under the desired tension. To facilitate this operation of the bar, the end thereof beyond the finger is formed cylindrical, so that it rolls readily against the face of a fence-post.

To provide for cutting the wire, the metal of the bar 5 at the opposite side from the finger 9 is drawn or shaped into a cutting edge or blade 11, this blade extending longitudinally of the bar 5 and being just to one side of that portion of the bar about which the fence-wire is wound in the stretching operation, so that when the wire has been stretched to the proper tension it may be stapled fast and then manipulated to lie across the cutting-blade, where it may be struck with a hammer to cut it. Instead of forming this blade of the same metal as the bar it will be understood that it may be formed of a separate piece of metal welded or otherwise attached to the bar at the proper point.

By forming the finger 9 with its extremity turned inwardly toward the bar 5 the tool makes an efficient staple-puller. To pull staples, the extremity of the finger is engaged through or around the bight of the staple and the bar 5 is disposed with its adjacent end against the post as a fulcrum, when the lever is operated to draw the staple, the curvature of the finger preventing the staple from accidentally leaving the finger, although it may be subsequently withdrawn readily.

It will be noted from the above description that the present tool has three distinct uses, and in each use of the tool an element is employed which is employed in another use of the tool, so that each of the elements, with the exception of the cutting edge, has a number of uses.

What is claimed is—

A wire stretching and cutting tool consisting of a bar having a handle at one end and having adjacent to its opposite end a finger rising in arched shape from the bar and extending longitudinally of the latter in the direction of the end of the bar opposite to the handle, and a cutting edge projecting from the bar at a point diametrically opposite to the base of the finger, said cutting edge extending longitudinally of the bar.

In testimony whereof I affix my signature in presence of two witnesses.

JOHN W. MONTGOMERY.

Witnesses:
W. A. BUCHANAN,
A. L. MUNN.